A. L. HATFIELD.
WATER GAGE.
APPLICATION FILED JAN. 27, 1919.
1,324,046.
Patented Dec. 9, 1919.
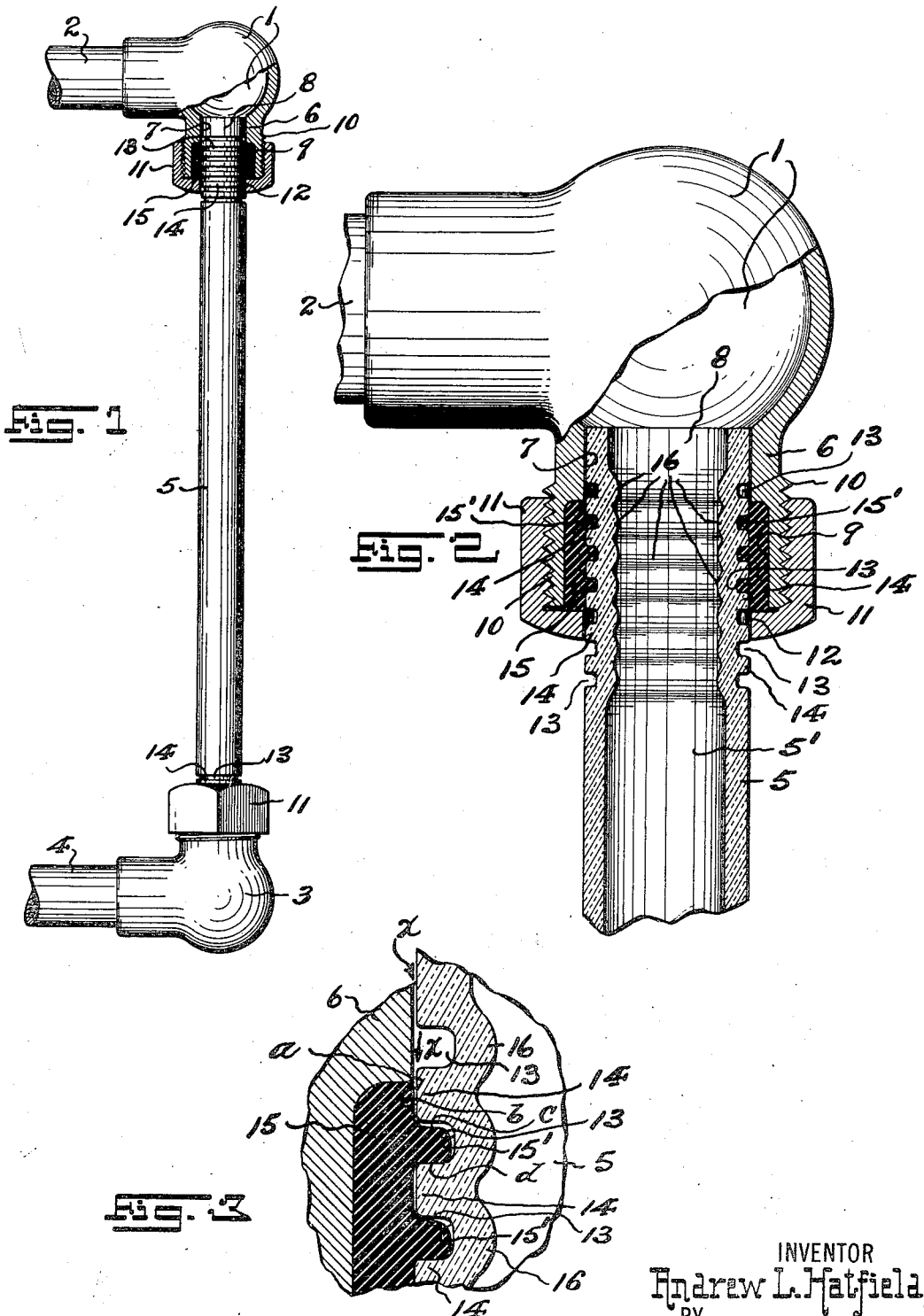
INVENTOR
Andrew L. Hatfield,
BY
Traeutzel & Richards,
ATTORNEYS

UNITED STATES PATENT OFFICE.

ANDREW L. HATFIELD, OF HILLSIDE, NEW JERSEY.

WATER-GAGE.

1,324,046.　　　　Specification of Letters Patent.　　Patented Dec. 9, 1919.

Application filed January 27, 1919. Serial No. 273,290.

*To all whom it may concern:*

Be it known that I, ANDREW L. HATFIELD, a citizen of the United States, residing at Hillside, in the county of Union and State of New Jersey, have invented certain new and useful Improvements in Water-Gages; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in the construction of water gages for steam boilers, and the like; and the invention relates more particularly to a novel ocnstruction of water gage glass or tube and means for packing the same in its supporting fittings to render the same proof against leaks under high pressure.

The present invention has for its principal object to provide an improved construction of water gage glass or tube having a novel construction of packing engaging surface adapted to render a pressure tight and leak resisting union or joint between the gage glass or tube and the packing in which it is seated.

Other objects of the present invention, not at this time more particularly enumerated, will be clearly understood from the following detailed description of the same.

The invention consists, therefore, in the novel construction of water gage device for boilers, and the like, described in the following specification, and then finally embodied in the claims appended to said specification.

The invention is clearly illustrated in the accompanying drawings, in which:—

Figure 1 is a side elevation of my novel construction of water gage mounted in its supporting fittings, one of said fittings being illustrated in section to disclose the seating of the end of the gage glass or tube therein.

Fig. 2 is a detail vertical longitudinal section of one end of the gage glass or tube as seated in a supporting fitting, the same being drawn on an enlarged scale.

Fig. 3 is a similar detail vertical section through portions of the gage glass or tube, packing and supporting fitting, and adapted to illustrate, more particularly, the effects of internal pressure upon the packing in conjunction with the novel construction of packing engaging surface with which said gage glass or tube is provided, said view being drawn upon a further enlarged scale.

Similar characters of reference are employed in all of the hereinabove described views, to indicate corresponding parts.

Referring now to said drawings, the reference character 1 indicates an upper fitting or socket member which is connected by piping 2 with a steam boiler or the like (not shown), and the reference character 3 indicates a lower fitting or socket member which is likewise connected by piping 4 with said steam boiler or the like. The novel gage glass or tube 5, to be subsequently described in detail, is supported by its respective ends in said respective fittings or socket members 1 and 3, so as to extend vertically therebetween. Each fitting or socket member is provided with a stuffing-box neck 6 having a cylindrical opening 7 for the reception of the ends 8 of the gage glass or tube 5. Each stuffing-box neck 6 is provided with an internal annular packing seat or chamber 9 in its free end. Each stuffing-box neck 6 is further provided with external screw threads 10, upon which screws the internally threaded stuffing box cap 11 for closing the outer end of the packing seat of chamber 9, said stuffing-box cap having the central opening 12 in the body thereof adapted to permit the end of gage glass to extend therethrough.

Formed in said gage glass or tube 5, adjacent to each end 8 thereof, are a series of externally disposed annular channels or grooves 13 separated by intermediate annular ribs or baffles 14. The distribution of said alternated channels and baffles with reference to the ends of the glass or tube is such that, when the ends of said glass or tube are inserted into the stuffing-box necks 6, at least a plurality of said alternated channels or baffles will be disposed opposite the packing seats or chambers 9 of said stuffing-box necks, in a position ready to be engaged by a packing 15 placed in said seats or chambers 9.

After the packing 15 has been placed in the packing seat or chamber 9, so as to surround the gage glass or tube, the stuffing-box cap 11 is screwed home on the stuffing-box neck 6 to squeeze or place under expanded pressure said packing 15. When the packing 15 is thus expanded, that portion thereof adjacent to the ends of the gage glass or tube 5 is pressed or forced laterally into engagement with the outer edges of the ribs or baffles 14, so that portions 15' thereof enter into the channels or grooves 13 to a greater or less degree according to the expanding pressure exerted upon the packing. In this manner the packing is so related to the surface of the gage glass or tube that it dovetails with the alternated channels and baffles 13 and 14, and presents in conjunction therewith a tortuous path, instead of a smooth straight downward path less easily resisting the force of internal pressure tending to separate the packing from the surface of the gage glass or tube, with consequent liability to the creation of leaks. Not only does the above stated relation of the packing to the gage glass or tube providing the tortuous path, which the force of internal pressure is thus compelled to travel, render greater resistance to the separation of the packing from the surface of the gage glass or tube, but it also provides intermeshing portions of alternated packing body and glass body positioned at substantially right angles to the normal direction of the forces of internal pressure, whereby the force of internal pressure itself will tend to press more firmly and securely than ever the packing portions in close sealing contact with said glass portions. This will be more clearly understood by referring to the detail view shown at Fig. 3 of the drawings. Assuming that the internal pressure is exerting a force in the normal direction indicated by the arrows X, such force might succeed in pressing apart the packing 15 at the point indicated by the character (a) from the outer face (b) of the baffle there located, but the force of the pressure being vertically downward meets opposition in the obstruction provided by the next adjacent horizontal portion 15' of the packing 15, and exerts a downward pressure upon the upper surface (c) thereof, which pushes bodily downward the packing portion 15' so as to force the lower surface (d) thereof into more closely sealing engagement with the upper surface of the next lower and adjacent baffle 14. Even though some of the pressure thus exerted succeeds in escaping beyond said latter baffle 14, and between the outer surface thereof and the body of the packing 15, the force thereof must be considerably reduced, and again meets with further obstruction provided by the next succeeding horizontal portion 15' of the packing 15, whereby the pressure exerted on such portion tends to seal the same against the side of the next lower baffle, and so the novel relation of the packing to the novel surface of the glass or tube compels the internal pressure to more closely unite the packing with the gage glass or tube, rather than tending to separate the same therefrom, and consequently leakage is rendered practically impossible.

Another very important advantage to be attributed to the novel construction of gage glass, and the novel relation of the packing thereto resultant from said construction, lies in the fact, that it is not necessary to expand the packing to exert a great degree of lateral pressure upon the glass or tube, whereby consequent danger of breaking the latter is so likely, and in fact is of such frequent occurrence with the old straight or plain surfaced types of gage glasses or tubes. With my construction it is only necessary to turn the stuffing-box cap 11 down as tight as it can be turned with the fingers, to assure a proper sealing relation between the packing and the gage glass, and therefore dangerous lateral pressure of the packing against gage glass or tube may be eliminated.

In order to prevent undue weakening of the gage glass body at the points where the annular channels 13 are disposed, I provide internal annular reinforcing bosses or ribs 16 on the walls of the tubular passage 5' of the gage glass, said bosses or ribs 16 being located opposite the channels 13, or in other words, coincident with the same in their lateral annular positions. In the process of manufacture the ends of the gage glass or tube are heated to attain the required degree of plasticity, whereupon the same is rotated on its vertical axis and the external annular channels 13 depressed in the outer surface thereof, which simultaneously produces the internal annular bulge resulting in the required annular reinforceing bosses or ribs 16. Although the above method is cheap and satisfactory, other methods of producing the external alternated annular channels 13 and baffles 14 may be used, either with or without the production of the internal reinforcing bosses or ribs 16. In cases where thick gage glasses are required with comparatively shallow channels 13, the internal bosses or ribs 16 may be dispensed with. At any rate, the essential features of the construction are comprised in the external alternated channels 13 and baffles 14, so that I do not wish to limit myself to the use of the reinforcing bosses or ribs 16 in every instance.

I claim:—

1. A gage glass comprising a tubular body member, a plurality of laterally parallel alternated annular channels and annular baffles arranged on the external surface of said tubular body adjacent to each end thereof.

2. A gage glass comprising a tubular body, the ends of said body being provided on their external sides with a plurality of laterally parallel vertically spaced annular channels adapted to receive inwardly projecting portions of a packing applied to surround said ends.

3. A gage glass comprising a tubular body, the ends of said body being provided on their external sides with a plurality of laterally parallel vertically spaced annular baffles.

4. A gage glass comprising a tubular body, a plurality of alternated annular channels and annular baffles arranged on the external surface of said tubular body adjacent to each end thereof, and internal annular reinforcing bosses in lateral alinement with said annular channels.

5. A gage glass comprising a tubular body, the ends of said body being provided on their external sides with a plurality of vertically spaced annular channels adapted to receive inwardly projecting portions of a packing applied to surround said ends, and a plurality of annular reinforcing bosses formed on the internal sides of said tubular body respectively arranged in lateral alinement with said respective annular channels.

6. In a device of the kind described, a pair of socket members, externally threaded stuffing-box necks connected with said socket members, said necks having in their free ends internal annular packing seats, a tubular gage glass the ends of which are respectively received in said necks, a plurality of alternated annular channels and annular baffles arranged on the external surface of said gage glass adjacent to each end thereof and disposed opposite said packing seats, packing seated in said packing seats to surround said gage glass, and internally threaded stuffing-box caps to screw on said necks and thereby expand said packing to dovetail the same with said alternated channels and baffles of said gage glass.

7. In a device of the kind described, a pair of socket members, externally threaded stuffing-box necks connected with said socket members, said necks having in their free ends internal annular packing seats, a tubular gage glass the ends of which are respectively received in said necks, the ends of said gage glass having on their external sides a plurality of vertically spaced annular channels disposed opposite said packing seats, packing seated in said packing seats to surround said gage glass, and internally threaded stuffing-box caps to screw on said necks and thereby expand said packing to force lateral projections thereof into said channels of said gage glass.

8. In a device of the kind described, a pair of socket members, externally threaded stuffing-box necks connected with said socket members, said necks having in their free ends internal annular packing seats, a tubular gage glass the ends of which are respectively received in said necks, the ends of said gage glass having on their external sides a plurality of vertically spaced annular channels disposed opposite said packing seats, a plurality of annular reinforcing bosses formed on the internal sides of said gage glass respectively arranged in lateral alinement with said respective annular channels, packing seated in said packing seats to surround said gage glass, and internally threaded stuffing-box caps to screw on said necks and thereby expand said packing to force lateral projections thereof into said channels of said gage glass.

In testimony that I claim the invention
In testimony that I claim the invention 25th day of January, 1919.

ANDREW L. HATFIELD.

Witnesses:
GEORGE D. RICHARDS,
JOSEPH C. YOUNG.